United States Patent
Gao et al.

(10) Patent No.: US 9,344,664 B2
(45) Date of Patent: May 17, 2016

(54) CONTROL METHOD OF PLASMA TV, A BLUETOOTH TOUCH CONTROL PEN AND A PLASMA TV

(71) Applicant: Goertek. Inc., Weifang, ShanDong Province (CN)

(72) Inventors: Qiang Gao, Weifang (CN); Hengjiang Guo, Weifang (CN); Fei Wang, Weifang (CN)

(73) Assignee: Goertek, Inc., Weifang, Shandong Province (CN)

( * ) Notice: Subject to any disclaimer, the term of this patent is extended or adjusted under 35 U.S.C. 154(b) by 0 days.

(21) Appl. No.: 14/404,168

(22) PCT Filed: Apr. 12, 2013

(86) PCT No.: PCT/CN2013/074146
§ 371 (c)(1),
(2) Date: Nov. 26, 2014

(87) PCT Pub. No.: WO2013/177979
PCT Pub. Date: Dec. 5, 2013

(65) Prior Publication Data
US 2015/0138443 A1    May 21, 2015

(30) Foreign Application Priority Data
May 28, 2012    (CN) .......................... 2012 1 0169275

(51) Int. Cl.
*G06F 3/042*    (2006.01)
*H04N 5/44*    (2011.01)
(Continued)

(52) U.S. Cl.
CPC .......... *H04N 5/4403* (2013.01); *G06F 3/03545* (2013.01); *H04N 3/125* (2013.01);
(Continued)

(58) Field of Classification Search
CPC .............. G06F 3/03542; G06F 3/0321; G06F 3/03545; G06F 3/042; G06F 2203/0384; G06F 3/0423
See application file for complete search history.

(56) References Cited

U.S. PATENT DOCUMENTS 5,633,691 A * 5/1997 Vogeley ................ G06F 3/0321
345/175
5,661,506 A * 8/1997 Lazzouni ............ G06F 3/03545
178/18.01
(Continued)

FOREIGN PATENT DOCUMENTS

CN    201282516    7/2009
CN    101520706    9/2009
(Continued)

OTHER PUBLICATIONS

CN 201210169275.9, Notification to Grant an Invention Patent, dated Oct. 30, 2014 pages, and English Translation, 4 pages.
(Continued)

*Primary Examiner* — Michael J Eurice
(74) *Attorney, Agent, or Firm* — Boyle Fredrickson, S.C.

(57) ABSTRACT

Disclosed are a control method of plasma TV, a Bluetooth touch control pen and a plasma TV, the method comprising: configuring all or part of the pixel points of a plasma TV screen to transmit a light signal carrying pixel position information; a touch control pen receiving the light signal by contacting the screen, calculating the pixel coordinate values of the position of a contact point on the screen according to the pixel position information in the light signal, and transmitting the calculated pixel coordinate values to the plasma TV via Bluetooth transmission; the plasma TV conducting a corresponding operation according to the received pixel coordinate values. The present invention realizes a novel touch control solution for large screen plasma TVs, and the solution has good user experience and low cost.

6 Claims, 3 Drawing Sheets

(51) Int. Cl.
  *H04N 21/422* (2011.01)
  *H04N 21/47* (2011.01)
  *H04N 3/12* (2006.01)
  *G06F 3/03* (2006.01)
  *G06F 3/0354* (2013.01)
  *G09G 3/28* (2013.01)

(52) U.S. Cl.
  CPC ... H04N21/42221 (2013.01); H04N 21/42222 (2013.01); H04N 21/47 (2013.01); *G06F 3/0321* (2013.01); *G06F 3/03542* (2013.01); *G06F 3/042* (2013.01); *G06F 3/0423* (2013.01); *G06F 2203/0384* (2013.01); *G09G 3/28* (2013.01); *H04N 2005/443* (2013.01); *H04N 2005/4426* (2013.01); *H04N 2005/4432* (2013.01)

(56) References Cited

U.S. PATENT DOCUMENTS

| | | | | |
|---|---|---|---|---|
| 2002/0125324 | A1* | 9/2002 | Yavid | H04N 9/3129 235/462.45 |
| 2005/0099405 | A1* | 5/2005 | Dietz | G06F 3/03542 345/179 |
| 2005/0104849 | A1* | 5/2005 | Hoile | G06F 3/0325 345/157 |
| 2005/0134538 | A1 | 6/2005 | Aoki | |
| 2009/0212702 | A1* | 8/2009 | Yim | G06F 3/0421 313/582 |
| 2009/0219262 | A1* | 9/2009 | Champion | G06F 3/03542 345/179 |
| 2010/0079384 | A1 | 4/2010 | Grivna | |
| 2010/0315332 | A1* | 12/2010 | Soh | G06F 3/03542 345/157 |
| 2011/0227827 | A1* | 9/2011 | Solomon | G06F 3/0321 345/158 |
| 2012/0206349 | A1* | 8/2012 | Nowatzyk | G06F 3/03545 345/158 |

FOREIGN PATENT DOCUMENTS

| | | |
|---|---|---|
| CN | 201499231 | 6/2010 |
| CN | 202043217 | 11/2011 |
| CN | 102740020 | 10/2012 |
| CN | 202738008 | 2/2013 |

OTHER PUBLICATIONS

CN 201210169275.9. The First Office Action, Apr. 1, 2014, 7 pages, and English Translation, 9 pages.

* cited by examiner

CONTROL METHOD OF PLASMA TV, A BLUETOOTH TOUCH CONTROL PEN AND A PLASMA TV

TECHNICAL FIELD

The present invention relates to the fields of plasma TV technology and short-range wireless technology, also known as BLUETOOTH technology, and particularly relates to a control method of plasma TV, a a short-range wireless touch control pen and a plasma TV.

BACKGROUND OF THE INVENTION

Due to the advantages of light weight, strong anti-jamming capability, clear image and bright color, plasma TV finds favor with more and more consumers. However, the control of plasma TV still mainly stays on the traditional remote control, which greatly limits the application of plasma TV.

The currently widely utilized touch screen technology determines the position of the contact object sliding on the screen based on the change of capacitance on a capacitance screen or based on the change of resistance on a resistance screen. But with respect for large screen TV, the costs of these solutions are too expensive.

SUMMARY OF THE INVENTION

Therefore, the present invention provides a control method of plasma TV, a short-range wireless or BLUETOOTH touch control pen and a plasma TV, realizes a novel touch control solution for large screen plasma TVs, and the solution has good user experience and low cost.

To achieve the aforesaid purpose, the technical solution of the present invention is achieved as follows:

The present invention discloses a control method of plasma TV, the method comprising:
configuring all or part of the pixel points of a plasma TV screen to transmit a light signal carrying pixel position information;
a touch control pen receiving the light signal by contacting the screen, calculating the pixel coordinate values of the position of the contact point on the screen according to the pixel position information in the light signal, and transmitting the calculated pixel coordinate values to the plasma TV via a short-range-wireless or BLUETOOTH transmission;
the plasma TV conducting a corresponding operation according to the received pixel coordinate values.

The pixel position information comprises: the time point of screen-updating synchronizing signal, the time point of updating the pixel residing line and the time point of updating the pixel residing column;
the calculating the pixel coordinate values of the contact point on the screen according to the pixel position information in the light signal comprises: obtaining the ordinate value of pixel according to the time difference between the time point of updating the pixel residing line and the time point of screen-updating synchronizing signal, obtaining the abscissa value of pixel according to the time difference between the time point of updating the pixel residing column and the time point of screen-updating synchronizing signal.

The touch control pen receiving the light signal by contacting the screen comprises: a light coupling element of the touch control pen collecting the light signal by contacting the screen, a filter amplifying circuit of the touch control pen conducting filter amplifying and shaping process on the collected light signal;
the calculating the pixel coordinate values of the position of the contact point on the screen according to the pixel position information in the light signal comprises: a main controller of the touch control pen calculating the pixel coordinate values according to the pixel position information in the light signal after filter amplifying and shaping process;
the transmitting the calculated pixel coordinate values to the plasma TV via BLUETOOTH transmission comprises: the BLUETOOTH radiofrequency module of the touch control pen transmitting the calculated pixel coordinate values to the plasma TV via BLUETOOTH wireless transmission.

The present invention further discloses a BLUETOOTH touch control pen, the touch control pen comprises: a light coupling element, a main controller and a BLUETOOTH radiofrequency module, wherein:
the light coupling element is for collecting a light signal carrying pixel position information by contacting a plasma TV screen;
the main controller is for calculating the pixel coordinate values of the contact point position of the light coupling element on the screen according to the pixel position information in the light signal collected by the light coupling element;
the BLUETOOTH radiofrequency module is for transmitting the pixel coordinate values calculated by the main controller to the plasma TV via BLUETOOTH wireless transmission.

The light coupling element, by contacting the plasma TV screen, collects the light signal carrying the time point of screen-updating synchronizing signal, the time point of updating the pixel residing line and the time point of updating the pixel residing column;
the main controller obtains the ordinate value of pixel according to the time difference between the time point of updating the pixel residing line and the time point of screen-updating synchronizing signal, and obtains the abscissa value of pixel according to the time difference between the time point of updating the pixel residing column and the time point of screen-updating synchronizing signal.

The BLUETOOTH touch control pen further comprises: a filter amplifying circuit, for transmitting the light signal collected by the light coupling element to the main controller after having been conducted filter amplifying and shaping process.

The BLUETOOTH touch control pen further comprises:
a control button, for controlling the turn on/off of the BLUETOOTH touch control pen, BLUETOOTH linking and the turn on/off of the light coupling element;
an indication light, for indicating the operating state of the BLUETOOTH touch control pen.

The present invention further discloses a plasma TV, said plasma TV comprises: a screen-updating configuring module, a screen, a BLUETOOTH receiving module and an operation processing module, wherein:
the screen-updating configuring module is for configuring all or part of the pixel points of a screen to transmit a light signal carrying pixel position information;
the BLUETOOTH receiving module is for receiving the pixel coordinate values transmitted by the BLUETOOTH touch control pen, and transmitting the pixel coordinate values to the operation processing module;
the operation processing module is for conducting a corresponding operation according to the received pixel coordinate values.

The screen-updating configuring module is for configuring all or part of the pixel points of a screen to transmit a light signal carrying the time point of screen-updating synchronizing signal, the time point of updating the pixel residing line and the time point of updating the pixel residing column.

The operation processing module is for conducting predetermined operation or displaying drawing in the corresponding pixel position according to the received pixel coordinate values.

Thus, it is seen that the technical solution of the present invention realizes a new control solution for plasma TV, by configuring all or part of the pixel points of a plasma TV screen to transmit the light signal carrying pixel position information, touch control pen receiving light signal by contacting the screen, calculating the pixel coordinate values of the position of a contact point on the screen according to the pixel position information in the light signal, and transmitting the calculated pixel coordinate values via BLUETOOTH transmission to the plasma TV, the plasma TV conducting a corresponding operation according to the received pixel coordinate values, and the solution has good user experience and low cost.

EMBODIMENTS OF THE PRESENT INVENTION

In order to better understand the object, the technical solution and the advantage of the present invention, the embodiment of the present invention will be further described in details in combination with the attached drawings.

Figure 1:
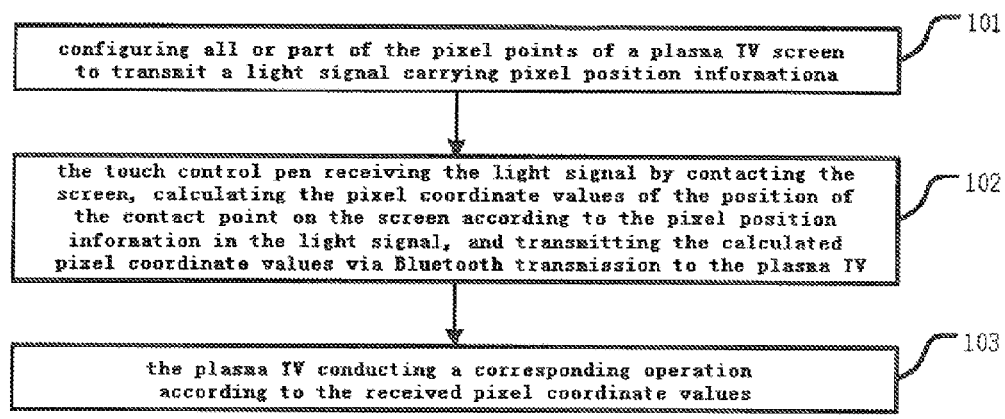
FIG. 1 is the flow chart of a control method for plasma TV according to an example of the present invention.

FIG. 1 is the flow chart of the control method of plasma TV according to an example of the present invention. As shown in FIG. 1, said method comprises:

101, configuring all or part of the pixel points of a plasma TV screen to transmit a light signal carrying pixel position information.

In this step, it is optional to configure all of the pixel points of a plasma TV screen to transmit a light signal carrying pixel position information, it is also optional to configure part of the pixel points of a plasma TV screen to transmit a light signal carrying pixel position information, e.g., it is optional to configure the spaced pixel point in each line (or each volume) on the plasma TV screen to transmit a light signal carrying pixel position information. For example, in each line, the pixel points in odd number transmit a light signal carrying pixel position information, while the light signal from the pixel points in even number does not carry pixel position information, and is transmitted as usual without change.

In this step, the specific form of pixel position information can be configured according to actual condition, in one example of the present invention, the pixel position information is specifically: the time point of screen-updating synchronizing signal, the time point of updating the pixel residing line and the time point of updating the pixel residing column.

The time period of completing each screen-updating of plasma TV is fixed, e.g., 15.6 ms, herein, the time point of screen-updating synchronizing signal is the startup time of each screen-updating. The time point of each line-updating in the plasma TV is different, and the time point of each column-updating is different as well.

102, a touch control pen receiving a light signal by contacting the screen, calculating the pixel coordinate values of the position of the contact point on the screen according to the pixel position information in the light signal, and transmitting the calculated pixel coordinate values via BLUETOOTH transmission to the plasma TV.

In this step, a light coupling element of the touch control pen receives the light signal by contacting the screen, a filter amplifying circuit of the touch control pen conducts filter amplifying and shaping process on the collected light signal; a main controller of the touch control pen calculates the pixel coordinate values according to the pixel position information in the light signal after filter amplifying and shaping process, specifically: the ordinate value of pixel is obtained according to the time difference between the time point of updating the pixel residing line and the time point of screen-updating synchronizing signal, the abscissa value of pixel is obtained according to the time difference between the time point of updating the pixel residing column and the time point of screen-updating synchronizing signal.

Specifically, the pixel point residing line can be determined by the time difference between the time point of updating the pixel residing line and the time point of screen-updating synchronizing signal, i.e., the ordinate value of pixel is determined, and the pixel point residing column can be further determined by the time difference between the time point of updating the pixel residing column and the time point of screen-updating synchronizing signal, i.e., the abscissa value of pixel can be determined.

A BLUETOOTH radiofrequency module of the touch control pen transmits the calculated pixel coordinate values via BLUETOOTH wireless transmission to the plasma TV. 103, the plasma TV conducting a corresponding operation according to the received pixel coordinate values.

In this step, according to the received pixel coordinate values, the plasma TV conducts predetermined operation (e.g., the position that the touch control pen points is to close a certain window etc.,) or displays drawing in the corresponding pixel position.

In the method as shown in FIG. 1, the TV screen requires no change, only the light signal format during updating the TV screen requires change, at the light signal receiving terminal, a low-cost light coupling element and a main controller chip are used to achieve the collecting and data processing of plasma TV light signal, and wireless data transmission is achieved via BLUETOOTH means, the TV conducts displaying or corresponding operation after receiving pixel coordinate values.

Figure 2:
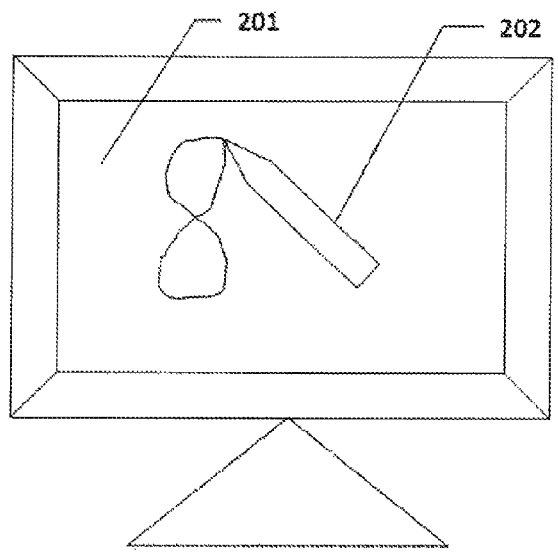
FIG. 2 is a schematic diagram of conducting drawing by using a BLUETOOTH touch control pen on a plasma TV screen according to the example of the present invention.

For example, the following purpose can be achieved: if the penpoint touches TV screen lightly, it is equivalent to single click operation of a mouse; if the penpoint is used to double click TV screen, it is equivalent to double click operation in a computer; if the penpoint is pressed and moved on the screen, it is equivalent to conducting drawing operation in a computer. FIG. 2 is a schematic diagram of conducting drawing by using a BLUETOOTH touch control pen on a plasma TV screen according to the example of the present invention. The BLUETOOTH touch control pen 202 conducts drawing on the screen of plasma TV 201, any moving operation of the touch control pen 202 on the screen will be displayed on the screen.

Figure 3:
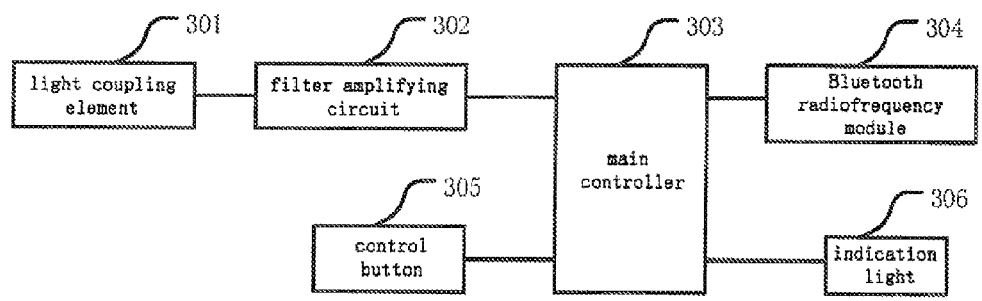
FIG. 3 is a structural schematic diagram of a BLUETOOTH touch control pen according to the example of the present invention.

FIG. 3 is a structural schematic diagram of a BLUETOOTH touch control pen according to the example of the present invention. As shown in FIG. 3, the BLUETOOTH touch control pen mainly comprises: a light coupling element 301, a filter amplifying circuit 302, a main controller 303 and a BLUETOOTH radiofrequency module 304, wherein:

the light coupling element 301 is for collecting the light signal carrying pixel position information by contacting the plasma TV screen;

the filter amplifying circuit 302 is for transmitting the light signal collected by the light coupling element 301 to the main controller 303 after having been conducted filter amplifying and shaping process;

the main controller 303 is for calculating the pixel coordinate values of the contact point position of light coupling element 301 on the screen according to the received pixel position information in the light signal;

the BLUETOOTH radiofrequency module 304 is for transmitting the pixel coordinate values calculated by main controller 303 via BLUETOOTH wireless transmission to the plasma TV.

In the BLUETOOTH touch control pen as shown in FIG. 3, light coupling element 301, by contacting the plasma TV screen, collects the light signal carrying the time point of screen-updating synchronizing signal, the time point of updating the pixel residing line and the time point of updating the pixel residing column;

The main controller 303 obtains the ordinate value of pixel according to the time difference between the time point of updating the pixel residing line and the time point of screen-updating synchronizing signal, and obtains the abscissa value of pixel according to the time difference between the time point of updating the pixel residing column and the time point of screen-updating synchronizing signal.

The BLUETOOTH touch control pen as shown in FIG. 3 also comprises:

control button 305, for controlling the turn on/off of BLUETOOTH touch control pen, BLUETOOTH linking and the turn on/off of the light coupling element;

an indication light 306, for indicating the operating state of the BLUETOOTH touch control pen.

In addition, the BLUETOOTH touch control pen may further comprises other elements such as a battery, a crystal oscillator, storage and a USB charging upgrade port.

Figure 4:
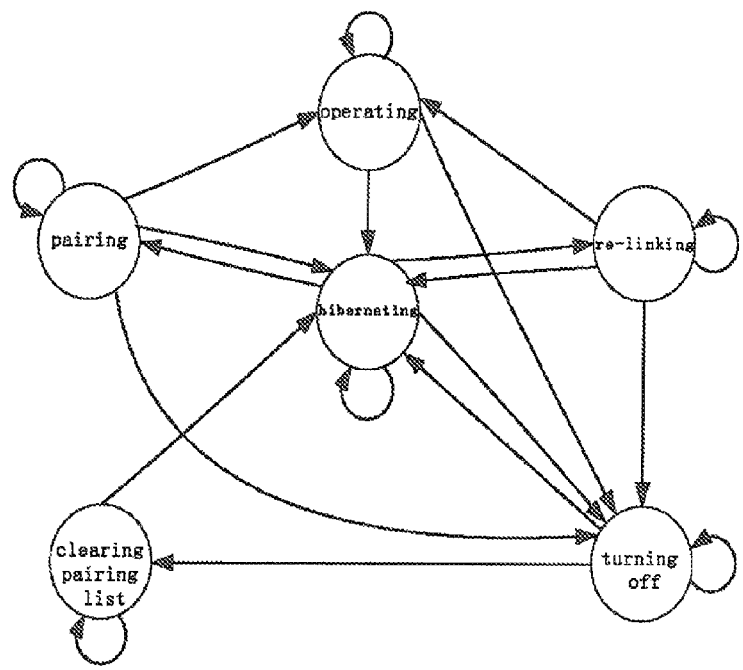
FIG. 4 is a schematic diagram of the operating state switching of the BLUETOOTH touch control pen.

FIG. 4 is a schematic diagram of the operating state switching of a BLUETOOTH touch control pen. As shown in FIG. 4, the BLUETOOTH touch control pen in the present invention has 6 operating states, which are respectively as: turning off, pairing, clearing pairing list, operating, hibernating and re-linking. The switching relationships among the states are shown in FIG. 4.

During operation, the BLUETOOTH link between the BLUETOOTH touch control pen and the plasma TV is built firstly. At a first link, the BLUETOOTH touch control pen enters into an initiative search mode, and searches a BLUETOOTH-support TV. After the search is done, the BLUETOOTH touch control pen automatically links the closest TV. If a link was built previously, after turning on, the BLUETOOTH touch control pen will automatically re-link the previously linked TV. After the BLUETOOTH link is successfully done, the user can conduct controlling by contacting the touch control pen with any point on the plasma TV screen, and also can conduct operations such as writing, drawing within the text window of the screen. The touch control pen automatically enters into low power mode when laid aside for a certain period of time, and if the user needs to use the touch control pen again, just click the pen on the screen, then the pen can be used immediately.

Figure 5:
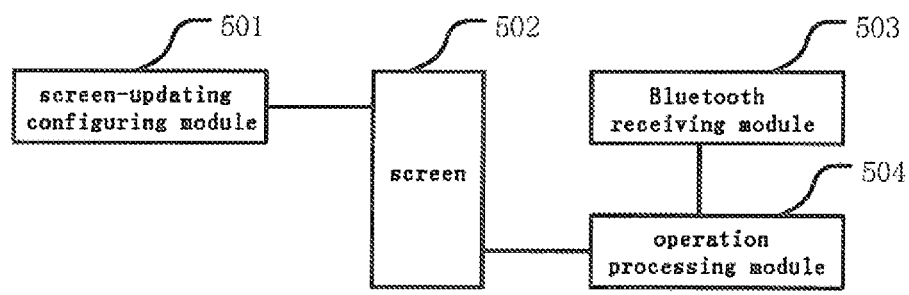
FIG. 5 is a structural schematic diagram of the plasma TV according to the example of the present invention.

FIG. 5 is a structural schematic diagram of a plasma TV according to the example of the present invention. As shown in FIG. 5, the plasma TV comprises: a screen-updating configuring module 501, a screen 502, a BLUETOOTH receiving module 503 and an operation processing module 504, wherein:

the screen-updating configuring module 501 is for configuring all or part of the pixel points of the screen 502 to transmit a light signal carrying pixel position information;

the BLUETOOTH receiving module 503 is for receiving the pixel coordinate values transmitted by BLUETOOTH touch control pen, and transmitting the pixel coordinate values to the operation processing module 504;

the operation processing module 504 is for conducting a corresponding operation according to the received pixel coordinate values, and conducting predetermined operation or displaying drawing in the corresponding pixel position etc., according to the received pixel coordinate values.

Wherein, the screen-updating configuring module 501 is for configuring all or part of the pixel points of the screen 502 to transmit the light signal carrying the time point of screen-updating synchronizing signal, the time point of updating the pixel residing line and the time point of updating the pixel residing column.

To sum up, by configuring all or part of the pixel points of a plasma TV screen to transmit a light signal carrying pixel position information, a touch control pen receiving the light signal by contacting the screen, calculating the pixel coordinate values of the position of the contact point on the screen according to the pixel position information in the light signal, and transmitting the calculated pixel coordinate values via BLUETOOTH transmission to the plasma TV, the plasma TV conducting a corresponding operation according to the received pixel coordinate values, the technical solution of the present invention realizes a new touch control manner for a large screen plasma TV, expands the application field of the plasma TV. And the solution has good user experience and low cost. The solution conducts data transmission by means of BLUETOOTH technology, has good versatility, high signal reliability, and strong anti-jamming capability, it also utilizes traditional BLUETOOTH technology to be in compatible with the plasma TV having BLUETOOTH function available in the market, and reduces redundancy of devices. The BLUETOOTH technology consuming low-power during standby time is also comparable to the traditional infrared remote.

Hereinbefore are merely the preferable examples of the present invention, which are not for restricting the protection scope of the present invention. That is, any modifications, equivalent substitutions and improvements without departing from the spirit and scope of the present invention are within the protection scope of the present invention.

What is claimed:

1. A control method of plasma TV, the method comprising the steps of:
    configuring all or part of the pixel points of a plasma TV screen to transmit a light signal carrying pixel position information, the pixel position information including a time point of screen-updating synchronizing signal, a time point of updating a pixel residing line and a time point of updating a pixel residing column;
    contacting the screen with a touch control pen to receive the light signal, the touch control pen contacting the screen at a contact point;

calculating pixel coordinate values of the contact point on the screen according to the pixel position information in the light signal; and transmitting the calculated pixel coordinate values to the plasma TV via a short-range wireless transmission;

conducting a predetermined operation or displaying a drawing in the corresponding pixel position with the plasma TV according to the pixel coordinate values received by the plasma TV:

wherein:

the pixel coordinate values of the contact point on the screen are calculated according to the steps of:

obtaining an ordinate value of a pixel according to the time difference between the time point of updating the pixel residing line and the time point of screen-updating synchronizing signal; and obtaining an abscissa value of the pixel according to the time difference between the time point of updating the pixel residing column and the time point of screen-updating synchronizing signal.

2. The method according to claim 1, wherein:

the step of the contacting the screen includes the additional steps:

collecting the light signal by contacting the screen with a light coupling element of the touch control pen; and conducting a filter amplifying and shaping process on the collected light signal with a filter amplifying circuit of the touch control pen; and the step of calculating the pixel coordinate values of the position of the contact point on the screen according to the pixel position information in the light signal includes the additional step of calculating the pixel coordinate values according to the pixel position information in the light signal with a main controller of the touch control pen after performing the step of conducting the filter amplifying and shaping process; and the step of transmitting the calculated pixel coordinate values to the plasma TV via the short-range wireless transmission includes the step of transmitting the calculated pixel coordinate values to the plasma TV via with a short-range wireless radiofrequency module.

3. A short-range wireless touch control pen, comprising: a light coupling element, a main controller and a short-range wireless radiofrequency module; wherein:

the light coupling element collects a light signal carrying pixel position information by contacting a plasma TV screen at a contact point, the pixel position information including a time point of screen-updating synchronizing signal, a time point of updating a pixel residing line and a time point of updating a pixel residing column;

the main controller is configured to calculate pixel coordinate values of the contact point position of the light coupling element on the screen according to the pixel position information in the light signal collected by the light coupling element;

the short-range wireless radiofrequency module transmits the pixel coordinate values calculated by the main controller to the plasma TV via a short-range wireless transmission; and the pixel coordinate values of the contact point are calculated according to the steps of:

obtaining an ordinate value of a pixel according to the time difference between the time point of updating the pixel residing line and the time point of screen-updating synchronizing signal; and obtaining an abscissa value of the pixel according to the time difference between the time point of updating the pixel residing column and the time point of screen-updating synchronizing signal.

4. The short-range wireless touch control pen according to claim 3 further comprising: a filter amplifying circuit configured to transmit the light signal collected by the light coupling element to the main controller after conducting a filter amplifying and shaping process.

5. The short-range wireless touch control pen according claim 3 further comprising:

a control button configured to control the turning on and off of the short-range wireless touch control pen, short range wireless linking and the turning on and off of the light coupling element; and an indication light configured to indicate an operating state of the short-range wireless touch control pen.

6. A plasma TV, comprising: a screen-updating configuring module, a screen with pixel points, a short-range wireless receiving module and an operation processing module, wherein:

the screen-updating configuring module is for configuring all or part of the pixel points of the screen to transmit a light signal carrying pixel position information, the pixel position information including a time point of screen-updating synchronizing signal, a time point of updating a pixel residing line and a time point of updating a pixel residing column;

the short-range wireless receiving module for receiving pixel coordinate values transmitted by a short-range wireless touch control pen, and transmitting the pixel coordinate values to the operation processing module;

the operation processing module conducting a predetermined operation or displaying a drawing in a corresponding pixel position according to the received pixel coordinate values.

* * * * *